(12) United States Patent
Gruninger et al.

(10) Patent No.: US 7,680,337 B2
(45) Date of Patent: Mar. 16, 2010

(54) PROCESS FOR FINDING ENDMEMBERS IN A DATA SET

(75) Inventors: John Gruninger, Boston, MA (US); Steven Adler-Golden, Newtonville, MA (US)

(73) Assignee: Spectral Sciences, Inc., Burlington, MA (US)

( * ) Notice: Subject to any disclaimer, the term of this patent is extended or adjusted under 35 U.S.C. 154(b) by 1000 days.

(21) Appl. No.: 11/359,681

(22) Filed: Feb. 22, 2006

(65) Prior Publication Data

US 2006/0188161 A1    Aug. 24, 2006

Related U.S. Application Data

(60) Provisional application No. 60/655,185, filed on Feb. 22, 2005.

(51) Int. Cl.
*G06K 9/46* (2006.01)
*G06K 9/62* (2006.01)
*G01J 5/02* (2006.01)

(52) U.S. Cl. ............ 382/191; 250/339.07; 382/224

(58) Field of Classification Search ............ 382/191, 382/162, 164, 173, 224, 225, 274; 250/339.01, 250/339.07, 339.08; 348/144

See application file for complete search history.

(56) References Cited

U.S. PATENT DOCUMENTS

| | | | |
|---|---|---|---|
| 6,038,344 A * | 3/2000 | Palmadesso et al. ........ 382/191 |
| 6,075,891 A | 6/2000 | Burman | |
| 6,167,156 A | 12/2000 | Antoniades et al. | |
| 6,282,301 B1 * | 8/2001 | Haskett ...................... 382/103 |
| 6,304,664 B1 | 10/2001 | Silva et al. | |
| 6,480,273 B1 | 11/2002 | Brock et al. | |
| 6,484,099 B1 | 11/2002 | Holzer-Popp et al. | |
| 6,608,931 B2 * | 8/2003 | Sunshine et al. ............ 382/191 |
| 6,665,438 B1 * | 12/2003 | Lin ............................ 382/191 |
| 6,741,740 B2 | 5/2004 | Sunshine et al. | |

(Continued)

OTHER PUBLICATIONS

Bowles et al. (Jul. 1998) "Comparison of output from ORASIS and pixel purity calculations." Proc. SPIE vol. 3438 pp. 148-156.*

(Continued)

*Primary Examiner*—Brian P Werner
*Assistant Examiner*—Barry Drennan
(74) *Attorney, Agent, or Firm*—Brian M. Dingman; Mirick, O'Connell, DeMallie & Lougee, LLP

(57) ABSTRACT

The invention provides a method for identifying one or more materials in a scene by determining a set of spectral vectors, called endmembers, from a data set comprised of spectra from the image data, and matching the set of endmembers to predefined library materials. The image data of the scene is captured with a sensor, and comprises a plurality of spectra. The method applies an iterative mathematical criterion, termed residual minimization, to find the endmembers. The first endmember may be selected based on the largest mean square value or the largest mean magnitude value. Subsequent endmembers are determined by calculating weighting factors, such that the weighting factors are non-negative and the calculated vector differences, or residuals, generate the smallest error metric. The error metric is dependent upon the vector difference between two spectra in the image data set, and may be the mean squared vector difference between two spectra.

16 Claims, 1 Drawing Sheet

U.S. PATENT DOCUMENTS

| | | | | |
|---|---|---|---|---|
| 6,804,400 | B1* | 10/2004 | Sharp | 382/239 |
| 7,046,859 | B2* | 5/2006 | Bernstein et al. | 382/274 |
| 7,194,132 | B1* | 3/2007 | Stein | 382/190 |
| 7,567,712 | B2* | 7/2009 | Berman et al. | 382/191 |
| 2005/0286770 | A1* | 12/2005 | Hirata | 382/191 |

OTHER PUBLICATIONS

Cipar et al. (Apr. 2002) "Comparison of endmember extraction techniques." Proc. SPIE vol. 4725 pp. 1-9.*

Friedman, J.H. (Dec. 2001) "Greedy function approximation: a gradient boosting machine." Annals of Statistics, vol. 29 No. 5, pp. 1189-1232.*

Gruninger et al. (Jun. 2000) "Hyperspectral mixture analysis using constrained projections onto material subspaces." Proc. Int'l Symposium on Spectral Sensing Research, pp. 162-170.*

Gruninger et al. (Apr. 2001) "Automated optimal channel selection for spectral imaging sensors." Proc. SPIE vol. 4381, pp. 68-75.*

Plaza et al. (Mar. 2004) A quantitative and comparative analysis of endmember extraction algorithms from hyperspectral data. IEEE Trans. on Geoscience and Remote Sensing, vol. 42 No. 3, pp. 650-663.*

Zhu et al. (Jul. 2001) "Probability guided and minimum residual exhaustive searching approaches for subpixel classification." IEEE Int'l Geoscience and Remote Sensing Symposium, vol. 4 pp. 1883-1885.*

Research Systems Inc. (Oct. 2004) "RSI extends the power of remote sensing and image analysis with ENVI 4.1." Press Release. http://www.rsinc.com/pr/detail.asp?PRID=112, as archived by The Internet Archive, http://www.archive.org/.*

Winter ME. N-Finder: an algorithm for fast autonomous spectral end-member determination in hyperspectral data, Dept of Earth Sciences, University of Queensland and TRA, Inc. Jul. 1999.

Research Systems, Inc. ENVI 4.2 User's Guide, vol. 1 & 2, ITT Industries. Aug. 2005.

Boardman, JW, et al. Mapping target signatures via partial unmixing of AVIRIS data: in Summaries, 5th JPL Airborne Earth Science Wksp,1995,JPL Publication 95-1, v. 1, p. 23-26.

* cited by examiner

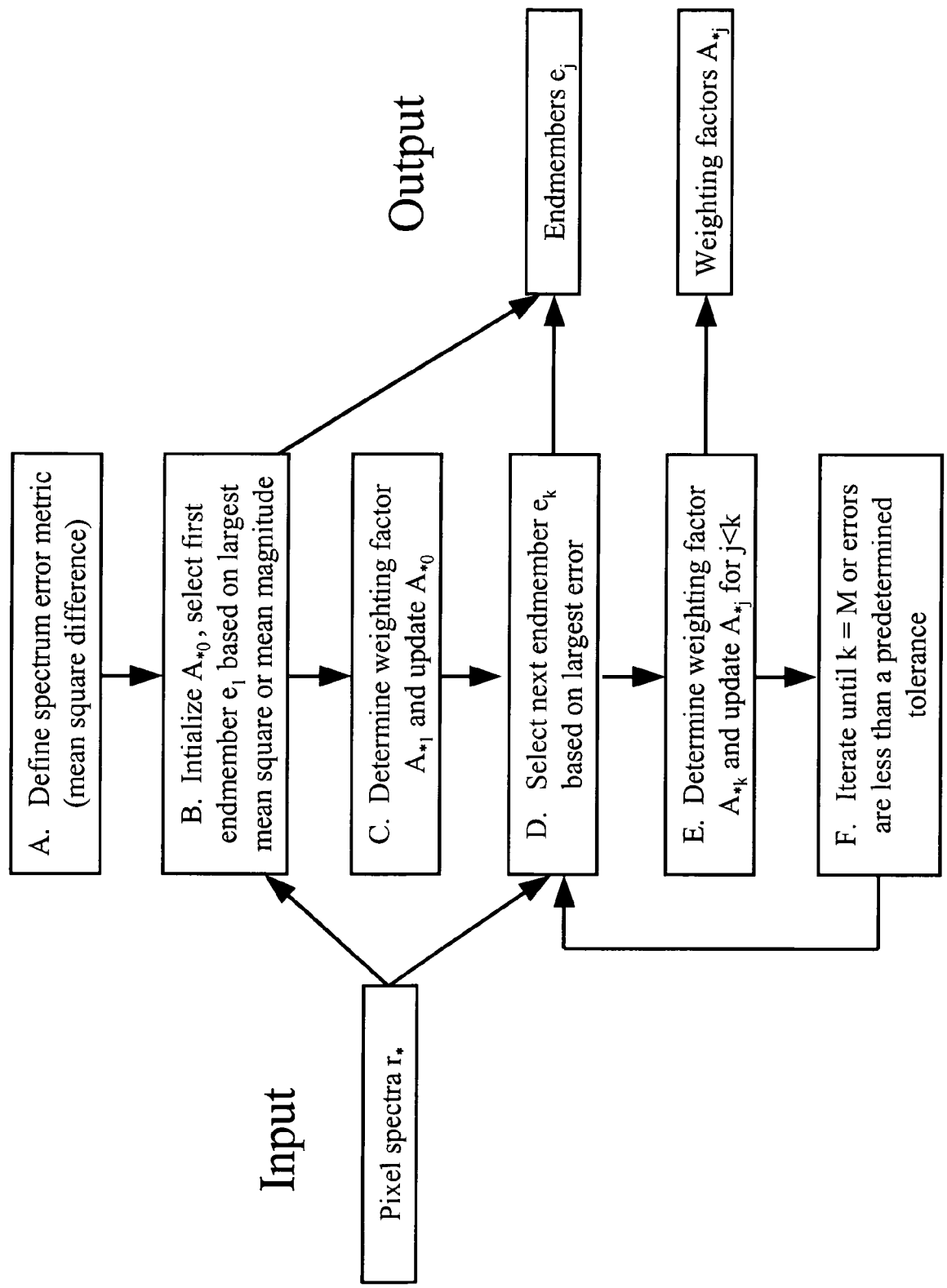

US 7,680,337 B2

PROCESS FOR FINDING ENDMEMBERS IN A DATA SET

CROSS REFERENCE TO RELATED APPLICATION

This application claims priority of Provisional application Ser. No. 60/655,185, filed on Feb. 22, 2005.

FIELD OF THE INVENTION

This invention relates to a process to rapidly and automatically find endmembers of a data set made up of spectra, such as a spectral image. Such endmembers are used in a number of applications, such as material classification.

BACKGROUND OF THE INVENTION

Endmembers are spectra that are chosen to represent the most "pure" surface materials from which the pixels in a spectral image are composed. Mathematically, they are basis spectra whose physically constrained linear combinations match the pixel spectra (to within some error tolerance), but which themselves cannot be represented by such linear combinations. "Physically constrained" means constrained by positivity, at least. Endmembers that represent radiance spectra must satisfy the positivity constraint. Other physically-based constraints may be imposed, such as sum-to-unity (i.e., the pixels are weighted mixtures of the endmembers) or sum-to-unity or less (i.e., the pixels are weighted mixtures of the endmembers plus "black"). The latter constraint is common for reflectance spectra. The invention allows selection of any of these constraints.

There are two different categories of endmembers and several different methods and algorithms for finding them. The first category consists of endmembers that do not necessarily correspond to specific pixels in the image. For example, they may represent materials of a purer composition than occur in the scene. Such spectra might be obtained from a library of laboratory-measured reflectances for a variety of materials that might be present. Alternatively, the endmembers may represent cluster averages, which match many spectra well but none exactly.

The invention (sometimes termed "SMACC" herein) relates primarily to the second category of endmembers, which are actual pixels in the image. There are several well-known algorithms for finding these endmembers. IDL's ENVI software contains a method based on a "Pixel Purity Index" [*ENVI Users Guide*, Research Systems, Inc., 2001] and supervised N-dimensional visualization. This method is not automated (it requires manual operation by an analyst) and is fairly time-consuming. Another method, called N-FINDR [http://www.sennacon.com/nfindr/], chooses endmembers based on a maximum-simplex-volume criterion, and is fully automated and reasonably fast.

There are many uses of endmembers, including classification, detection and data compression. The endmembers can be used to identify unique materials in the scene, and thus can be input to classification routines. They can also be used in a constrained least-squares unmixing routine to find targets and their pixel fill fraction, as an alternative to matched filtering. If the number of spectral channels is large, the endmember abundances are sparse (most values are zero), so the abundance image represents an efficient compression of the original data cube. Upon matching the endmembers to library materials, the abundances define the surface material composition of the scene. This enables one to estimate various physical properties, such as surface reflectance at wavelengths not originally measured.

SUMMARY OF THE INVENTION

The inventive SMACC method is similar to N-FINDR in its speed and automation. However, it uses a different mathematical criterion, termed residual minimization, for finding the endmembers, and thus produces somewhat different results. In addition, SMACC simultaneously generates estimated endmember weights (abundances) for each pixel, and, unlike N-FINDR, it can be used to generate more endmembers than there are spectral channels. This may be useful for multispectral data.

A drawback of SMACC is that it can be adversely affected by noise. When a large number of endmembers is sought, there may be redundancies (i.e., pixels identified as endmembers that actually are nearly identical to one another). In addition, the SMACC endmember weights do not match full constrained least-squares results, but rather are stepwise constrained least squares results. However, the SMACC results, which are obtained with less computational and/or analyst time, are similar to those from other methods.

Typical endmember algorithms are most efficient when the entire spectral image to be analyzed fits in the random access memory (RAM) of the computer processor. However, images that contain a very large number of pixels and/or spectral channels may be too large to fit in the RAM, causing the processor to spend additional time repeatedly transferring portions of the data between the RAM and the computer hard disk or other storage medium. The SMACC invention includes a method for finding endmembers for an image of arbitrary size while minimizing this additional transfer time, by dividing the image into smaller images that fit in the RAM.

The SMACC method allows the user to select positivity-only, sum-to-unity, or sum-to-unity-or-less constraints on the endmember weights. The positivity-only option is appropriate for unmixing reflectance spectra under conditions of variable illumination. In this case, the sum of the endmember abundances for a given pixel may exceed unity. The sum-to-unity-or-less option is recommended when a strict physical interpretation of the abundances in terms of material and shadow fractions is desired; the results are typically similar to the positivity-only case but not identical. The sum-to-unity option is recommended for unmixing spectra, such as radiances or thermal IR emissivities, when a zero endmember is not physically plausible, or when it is desired to find very dark endmembers such as shadow endmembers. The second endmember found is among the darkest pixels in the scene, if not the darkest.

This invention features a process for determining a subset of members of a group of N data vectors, such as spectra, the subset denoted as endmembers, which may be taken in positive linear combinations to approximate the other members of the group, comprising a. providing a data set (for example an image data) comprised of a plurality of spectra (for example, pixels in which each pixel comprises a spectrum), b. defining an error metric dependent on a difference between two spectra, c. selecting a first spectrum as the first endmember, d. for the member spectra in the group, determining a non-negative weighting factor such that, when the first spectrum is multiplied by the weighting factor and subtracted from the spectrum, the resulting difference generates a smallest error metric, e. selecting as a next endmember the member spectrum whose calculated difference from step d generates the largest error metric, f. for the N member spectra in the group, determining a weighting factor, determining an updated difference by subtracting from the prior difference the difference for the endmember in step e multiplied by the weighting factor, and determining an updated set of member weighting factors by subtracting from the prior set of weighting factors the set of weighting factors for the endmember in step d multiplied by the weighting factor, such that all updated weighting factors are non-negative and the updated member difference generates a smallest error metric, and g. repeating steps e and f for all or a subset of member spectra one or more times.

The process may further comprise multiplying each endmember by the weighting factor, to create a weighted endmember value. The process may further comprise approximating each member of a group of N spectra by means of a sum of the weighted endmember values. The invention can also feature a process for determining a subset of members of a group of N spectra, the subset denoted as endmembers, which may be taken in positive linear combinations to approximate the other members of the group, comprising dividing the group of N spectra into sub-groups, determining endmembers of each sub-group by the process described above, forming the endmembers of the sub-groups into an endmember group, and determining endmembers of the endmember group by the process described above. The group of N spectra may be divided into sub-groups, and the weighting factors for the members in each sub-group may be determined.

The error metric may be the mean squared spectrum difference. The first spectrum may include the spectrum in the group with the largest mean or mean squared value. The first spectrum may include a target spectrum in the group. The first spectrum may include a spectrum that is not in the group.

The determinations may include the additional condition that the sum of the weighting factors does not exceed one, or the sum of the weighting factors may equal one. Step g above may be carried out for only those member spectra for which the differences from step d are greater than a predetermined value. Step g may be carried out for all member spectra until the largest difference from step d among all the member spectra is less than a predetermined value. In the case in which the data set comprises image data, if a sensor is used to gather the image data, the predetermined value may be estimated from the sensor noise. Step g may be terminated when a predetermined number of endmembers have been selected. The difference between one and the sum of the weighting factors is output as a shade weighting factor.

This invention also features a process for approximating each member of a group of N data vectors, such as spectra, by means of a positive linear combination of a prior selected subset of members, the subset denoted as endmembers, each endmember being multiplied by a corresponding positive weighting factor, in which the process for determining the weighting factors comprises a. providing a data set (for example an image data) comprised of a plurality of spectra (for example pixels in which each pixel comprises a spectrum), b. defining an error metric dependent on a spectrum difference, c. selecting a first endmember as a starting spectrum, d. for each of the N member spectra in the group that is not the starting spectrum, determining a non-negative member weighting factor such that, when the starting spectrum is multiplied by the member weighting factor and subtracted from the member spectrum, the resulting member difference generates a smallest error metric, e. selecting a next endmember, f. for each of the N member spectra in the group that is not the starting spectrum or any selected endmember, determining a weighting factor, determining an updated member difference by subtracting from the prior member difference the difference for the endmember in step e multiplied by the weighting factor, and determining an updated set of member weighting factors by subtracting from the prior set of member weighting factors the set of weighting factors for the endmember in step e multiplied by the weighting factor, such that all updated member and endmember weighting factors are non-negative and the updated member difference generates a smallest error metric, and g. repeating steps e and f until all endmembers have been selected.

In this process, a subset of members of a group of N spectra may be determined, the subset denoted as endmembers, which may be taken in positive linear combinations to approximate the other members of the group. This may be accomplished by dividing the group of N spectra into sub-groups, determining endmembers of each sub-group by the process, forming the endmembers of the sub-groups into an endmember group, and determining endmembers of the endmember group by the process. The group of N spectra may be divided into sub-groups, and the weighting factors for the members in each sub-group may be determined.

BRIEF DESCRIPTION OF THE DRAWING

Other objects, features and advantages will occur to those skilled in the art from the following description of the invention and its preferred embodiments, including the FIGURE, which is a flow chart of the process of the two preferred embodiments described below.

DETAILED DESCRIPTION OF THE INVENTION

Nomenclature and Definitions

For ease of explanation, let the set of data vectors (which must be of equal length) be a group of N spectra (in the preferred embodiment the spectra are pixel spectra), in which each pixel spectrum consists of intensity values for a set of spectral channels.

The set of pixel spectra is denoted $\{r_1 r_2 \ldots r_N\}$. An arbitrary individual member of this set is denoted $r^*$.

The endmembers to be determined are a subset of the pixel spectra and are denoted $\{e_1 e_2 \ldots e_M\}$, where M is the number of endmembers. In addition, $e_0$ is defined as the spectrum consisting of all zero intensities, referred to as the zero endmember; it is used as a placeholder to implement an optional summation constraint as will be described.

Let $R^*$=the pixel spectrum vector difference (also referred to as the residual) between $r^*$ and its representation via the expression $\Sigma_k A^*_k e_k$, where k runs from 1 to M. $A^*_k$ is referred to as the weight (or weighting factor) of endmember k in the $r^*$ spectrum. In the preferred embodiments, $A^*_k$ is also defined for k=0, although its value does not affect the residual. $A^*_0$ is set to 1 in the first preferred embodiment and 0 in the second preferred embodiment.

When $r^*$ is an endmember, $e_j$, its residual is $R_j$. The representation of $e_j$ is written as $\Sigma_k A_{jk} e_k$, where k≠j. $A_{jk}$ is referred to as the weight (or weighting factor) of endmember k in endmember j.

Let $|x|$ denote the absolute value (length) of a spectrum vector x.

Let $p(x,y)$ denote the projection length of spectrum vector x onto spectrum vector y, given by $x \cdot y/|y|$.

ALGORITHM DESCRIPTION FOR THE FIRST PREFERRED EMBODIMENT

This first preferred embodiment algorithm provides a positivity constraint on the weights, and, optionally, a constraint that the weights for each pixel spectrum must sum to unity or less. If the latter constraint is not used, then the zero endmember variables (i.e., $A^*_0$) are not needed; however, for ease of explanation they are retained in both cases in the following description.

Step a: Define an Error Metric

Define the error metric as the mean square difference between two spectra (the mean of the squares of the differences of the corresponding channels).

Step b: Select a Starting Spectrum as the First Endmember

Set the weights of the $0^{th}$ endmember to unity, i.e., $A^*_0=1$, and select the pixel spectrum with the largest mean intensity squared or the largest mean intensity absolute value as endmember 1 ($e_1$).

Step c: For Each Pixel Spectrum, Determine the Weighting Factor for the First Endmember The weighting factor, $A^*_1$, is given by the larger of zero and $p(r^*,e_1)/|e_1|$. If it is desired to impose the optional constraint that the weights for each pixel sum to unity or less, $A^*_1$ is restricted to be unity or less; i.e., $A^*_1 \leq 1$. With this weighting factor definition, it can be shown that the mean square of the residual $$R^* = r^* - A^*_1 e_1 \quad (1a)$$

(i.e., the error metric) is minimized with respect to the allowable values of $A^*_1$. This residual represents the difference between the pixel spectrum and its representation by the first endmember alone.

Next, the j=0 endmember weights $A^*_0$ are updated by subtracting $A^*_1$; i.e., the updated weights are $A^*_0 = 1 - A^*_1$.

The following steps d and e constitute an iteration, or cycle, which is repeated as described in step f.

Step d: Select the Next Endmember

Select as the next endmember the pixel spectrum for which the most recently calculated residual R* (from the previous iteration or from step c) yields the largest error metric.

Step e: For Each Pixel Spectrum, Determine the Weighting Factor for the New Endmember Found in Step d.

For ease of illustration, the method is described below for endmember k, taken as an example.

Step e1: Calculate Provisional Weighting Factors by Projection.

The provisional values of $A^*_k$ are larger of zero and $p(R^*, R_k)/|R_k|$. The provisional updated residuals are $$R^* = R^{*prev} - A^*_k R_k, \quad (1b)$$

where $R^{*prev}$ are the most recently calculated residuals (from the previous iteration or from step c). This residual is equal to the difference between the pixel spectrum and its representation by a weighted sum of the endmembers determined up to this point. If it is desired to impose the optional constraint that the weights for each pixel must sum to unity or less, the provisional $A^*_k$ is restricted to be unity or less (i.e., $A^*_k \leq 1$).

In the updated pixel spectrum representation, the new endmember replaces a combination of prior endmembers that were used to represent it. Therefore, the previously determined weights of the prior endmembers in the pixel spectra no longer hold and must be updated; this is done in Step e2 below. In the updating process, the weights must not be allowed to become negative. This places an upper limit on the allowable value of the new endmember weight $A^*_k$, which is why the value calculated in step 1 is termed "provisional."

The $A^*_k$ value accounting for this upper limit is calculated in step e2, and the updated weights of the prior endmembers are calculated in step e4.

Step e2: Find Upper Limits of New Endmember Weights

For the previously determined weights to remain non-negative upon updating (step e4), an upper limit on $A^*_k$ is determined. To ensure that after $A^*_k A_{jk}$ is subtracted $A^*_j$ remains non-negative, the inequality $A^{*prev}_j \geq A^*_k A_{jk}$ must be satisfied. For a given previous endmember j>0, the maximum permissible value of $A^*_k$ is given by the ratio $A^{*prev}_j/A_{jk}$; therefore, the smallest of these ratios for all j>0 is found, and this ratio is set as the $A^*_k$ upper limit value. The $A^*_k$ value is then reset to be the smaller of the $A^*_k$ upper limit value and the $A^*_k$ provisional value given in Step e1.

For a given pixel, the sum over all j of the endmember weights $\Sigma_j A^*_j$ remains at unity from each iteration to the next. Therefore, if it is chosen to extend the inequality condition $A^{*prev}_j \geq A^*_k A_{jk}$ to j=0, thereby imposing a non-negativity constraint on $A^*_0$, the sum $\Sigma_j A^*_j$ is constrained to be unity or less over j>0 (i.e., over the non-zero endmembers). If this is not chosen, the sum is allowed to exceed unity.

Step e3: Update the Spectral Residuals and Error Metrics

The pixel and endmember residuals are updated via Eq. (1b) using the $A^*_k$ value determined from Step e2. The error metrics are recalculated using the updated residuals.

Step e4: Update the Weights

The weights $A^*_j$ (where j<k) are updated via $$A^*_j = A^{*prev}_j - A^*_k A_{jk}. \quad (2)$$

Step f: Repeat Steps d and e

Repeat steps d and e for endmembers 3, 4, etc., until the desired number of endmembers has been reached (i.e., k=M) and/or the error metrics have been reduced to smaller than a desired tolerance. For example, a tolerance may placed on the individual pixel error metrics, such that the repetition of steps d and e is halted for those pixels that have a smaller error metric; the repetition continues for those pixels that have a larger error metric. Alternatively, a tolerance may be placed on the largest pixel error metric, such that the repetition of steps d and e is halted for all pixels when they all have an error metric smaller than the tolerance.

ALGORITHM DESCRIPTION FOR THE SECOND PREFERRED EMBODIMENT

This second preferred embodiment algorithm provides a strict sum-to-unity constraint on the weights for each pixel. It is identical to the first preferred embodiment algorithm except that:

1. the starting values of $A^*_0$ are set to 0 in step b,
2. in step c, the $A^*_1$ are set to 1, and
3. in step e2, the weight of the j=0 endmember is included in the determination of the upper limit, i.e. $A^{*prev}_j \geq A^*_k A_{jk}$ for j=0 to k−1.

By applying the inequality (non-negativity condition) in step e.2 to j=0, $A^*_0$ remains zero. In combination with the sum-to-unity constraint on the $A^*_j$ where j=0 is included, this forces $\Sigma_j A^*_j = 1$ for j>0.

EXTENSION OF THE PREFERRED EMBODIMENTS TO ARBITRARILY LARGE IMAGES

For efficiently determining the endmembers of an image that is too large to fit into the computer RAM, the following method may be used with either the first or second preferred embodiment algorithms:

divide the image consisting of a group of N spectra into sub-groups of spectra;

determine endmembers of each sub-group by the preferred embodiment algorithm;

form the endmembers of the sub-group into an endmember group;

by the preferred embodiment algorithm, determine endmembers of the endmember group, which constitute endmembers of the image.

APPLICATIONS TO OTHER DATA SETS

The invention applies to data sets comprised of a plurality of spectra. The data vectors are typically, but not necessarily, spectra from images. Alternatively, the data vectors can be temporal, such as a time sequence of spectra.

Other details may be set forth in the provisional patent application from which priority is claimed, the entire disclosure of which is incorporated herein by reference.

What is claimed herein is:

1. A process for identifying one or more materials in a scene by determining a subset consisting of a number N of members, denoted as endmembers, of a data set of spectral vectors, denoted as spectra, such that the endmembers may be taken in positive linear combinations to approximate the remaining spectra of the data set, comprising:
   a. gathering image data of the scene with a sensor;
   b. providing a data set comprised of a plurality of spectra from the image data;
   c. defining an error metric dependent on a vector difference between two spectra in the data set;
   d. selecting a first spectrum from the data set as the first endmember;
   e. for each spectrum in the data set, determining an initial weighting factor of the first endmember, such that
      (1) the initial weighing factor is non-negative and
      (2) when the first endmember from step d is multiplied by the initial weighting factor and subtracted from the spectrum, the resulting vector difference, denoted as the residual, generates a smallest error metric;
   f. selecting as a new endmember the spectrum from the data set whose residual generates the largest error metric;
   g. designating the new endmember as the currently-considered endmember;
   h. for each spectrum in the data set,
      (1) determining a trial weighting factor of the currently-considered endmember, such that
         (i) the trial weighting factor of the currently-considered endmember is non-negative, and
         (ii) when the currently-considered endmember is multiplied by the trial weighting factor of the currently-considered endmember and subtracted from the spectrum, the resulting vector difference, designated as the trial current residual, generates a smallest error metric;
      (2) determining a trial revised residual by subtracting the trial current residual multiplied by the trial weighting factor for the currently considered endmember from the residual determined just prior to the trial current residual;
      (3) determining trial revised weighting factors of each of the endmembers selected prior to the currently-considered endmember by subtracting from the weighting factors of each of the endmembers selected prior to the currently-considered endmember the product of the trial weighting factor of the currently-considered endmember and the weighting factors of the endmembers selected prior to the currently-considered endmember for the currently-considered endmember;
   i. for each of the endmembers selected prior to the currently-considered endmember, identifying the trial revised weighting factors that are negative, and determining revised weighting factors and revised residuals such that the revised weighting factors are non-negative and the revised residuals generate a smallest error metric;
   j. designating the revised weighting factors as weighting factors and the revised residuals as residuals;
   k. repeating steps f, g, h, i and j for all or a subset of spectra in the data set one or more times, until a total of N endmembers have been determined.

2. The process of claim 1 further comprising multiplying each endmember by the weighting factor for that endmember, to create a weighted endmember value for each endmember.

3. The process of claim 2 further comprising approximating each member of the data set of spectra by means of a sum of the weighted endmember values.

4. The process of claim 1, further comprising:
   dividing the data set of spectra into sub-groups;
   determining endmembers of each sub-group by the process of steps c through k of claim 1;
   forming the endmembers of the sub-groups into an endmember group;
   determining endmembers of the endmember group by the process of steps c through k of claim 1.

5. The process of claim 1 in which the error metric of step c of claim 1 is the mean squared vector difference between two spectra in the data set.

6. The process of claim 1 in which the first spectrum of step d of claim 1 includes the spectrum in the data set with the largest mean or mean squared value.

7. The process of claim 1 in which the first spectrum of step d of claim 1 includes a target spectrum in the data set.

8. The process of claim 1 in which the determinations in step h include the additional condition that the sum of the trial revised weighting factors does not exceed 1.

9. The process of claim 1 in which the determinations in step h include the additional condition that the sum of the trial revised weighting factors equals 1.

10. The process of claim 1 in which step k is carried out for only those spectra in the data set for which the trial current residual from step h are greater than a predetermined value.

11. The process of claim 10 in which the sensor has noise and the predetermined value is estimated from the sensor noise.

12. The process of claim 11, further comprising:
   1. matching the endmembers to a predefined set of materials to identify the one or more materials in the scene.

13. The process of claim 1 in which step k is carried out for all spectra in the data set until the largest trial current residual from step h among all the spectra in the data set is less than a predetermined value.

14. The process of claim 13 in which the sensor has noise and the predetermined value is estimated from the sensor noise.

15. The process of claim 1 wherein the difference between 1 and the sum of the weighting factors is output as a shade weighting factor.

16. The process of claim 1 in which the image data comprises a plurality of pixels.

* * * * *

UNITED STATES PATENT AND TRADEMARK OFFICE
CERTIFICATE OF CORRECTION

PATENT NO. : 7,680,337 B2  Page 1 of 1
APPLICATION NO. : 11/359681
DATED : March 16, 2010
INVENTOR(S) : John Gruninger et al.

It is certified that error appears in the above-identified patent and that said Letters Patent is hereby corrected as shown below:

Column 7, line 36, should appear as follows:

(1) the initial "weighing" --weighting-- factor is non-negative and

Signed and Sealed this

Twenty-seventh Day of April, 2010

David J. Kappos
*Director of the United States Patent and Trademark Office*